(12) United States Patent
Engels et al.

(10) Patent No.: US 7,428,761 B2
(45) Date of Patent: Sep. 30, 2008

(54) ADJUSTABLE CHAIR FOR MEDICAL AND PARAMEDICAL DIAGNOSIS AND TREATMENT, AND ADJUSTABLE ERGONOMIC CHAIR

(76) Inventors: Paul Arthur Engels, 14, Bosbeeklaan, 2071 AL Santpoort-Noord (NL); Johannes Henricus Maria de Kroon, 8, Verlengde Haerderweg, 8085 RJ Doornspijk-'t Harde (NL); Gaston Lionel van Amerongen, 13, Klokjeslaan, 3601 HB Maarssen (NL)

( * ) Notice: Subject to any disclaimer, the term of this patent is extended or adjusted under 35 U.S.C. 154(b) by 0 days.

(21) Appl. No.: 10/507,561

(22) PCT Filed: Feb. 27, 2003

(86) PCT No.: PCT/NL03/00148

§ 371 (c)(1), (2), (4) Date: Sep. 14, 2004

(87) PCT Pub. No.: WO03/077821

PCT Pub. Date: Sep. 25, 2003

(65) Prior Publication Data

US 2005/0161992 A1  Jul. 28, 2005

(30) Foreign Application Priority Data

Mar. 19, 2002 (NL) ..................................... 1020201

(51) Int. Cl.
*A47B 7/00* (2006.01)
*A47B 7/02* (2006.01)

(52) U.S. Cl. .................................. 5/622; 5/617; 5/618

(58) Field of Classification Search ..................... 5/613, 5/618, 617, 636, 655.3, 601, 624, 622, 644; 297/284.11, 353, 354.13, 423.36, 397, 393, 297/395
See application file for complete search history.

(56) References Cited

U.S. PATENT DOCUMENTS

| | | | | |
|---|---|---|---|---|
| 1,626,091 | A | * | 4/1927 | Macklin ........................ 5/618 |
| 2,987,116 | A | | 6/1961 | Golden ........................ 155/191 |
| 3,061,843 | A | * | 11/1962 | Singer et al. .................... 5/618 |
| 3,554,599 | A | | 1/1971 | Pietschmann ................ 297/353 |
| 3,751,028 | A | * | 8/1973 | Scheininger et al. ........... 5/601 |
| 3,868,103 | A | * | 2/1975 | Pageot et al. ................... 5/614 |
| 4,017,118 | A | * | 4/1977 | Cawley ..................... 297/284.3 |
| 4,415,203 | A | * | 11/1983 | Cawley ...................... 297/391 |
| 4,773,708 | A | * | 9/1988 | Nastu ..................... 297/423.36 |
| 4,955,517 | A | * | 9/1990 | Maresca ...................... 224/155 |
| 5,645,313 | A | * | 7/1997 | Best et al. ....................... 297/68 |
| 5,802,638 | A | | 9/1998 | Parker et al. .................... 5/611 |
| 6,113,181 | A | * | 9/2000 | Tang ........................... 297/27 |
| 6,209,463 | B1 | * | 4/2001 | Koharchik et al. ............. 108/7 |
| 6,276,012 | B2 | * | 8/2001 | Borders ......................... 5/622 |
| 6,688,691 | B2 | * | 2/2004 | Marechal et al. ............ 297/317 |
| 2001/0022461 | A1 | * | 9/2001 | Marcantoni ............ 297/423.36 |
| 2003/0209933 | A1 | * | 11/2003 | Flory et al. ............ 297/423.36 |

* cited by examiner

*Primary Examiner*—Patricia Engle
*Assistant Examiner*—Jonathan J Liu
(74) *Attorney, Agent, or Firm*—Hoffmann & Baron, LLP

(57) ABSTRACT

Adjustable chair for medical and paramedical diagnosis and treatment, comprising a pillar, a seat, a chair back, a support for the lower legs and if appropriate a head rest, the height of the pillar being adjustable and the remainder of the parts mentioned being adjustable with respect to one another. The chair back, the seat and the support for the lower legs are adjustable into a fully extended (bed) position. Also an ergonomic chair, particularly an automobile chair.

9 Claims, 6 Drawing Sheets

ADJUSTABLE CHAIR FOR MEDICAL AND PARAMEDICAL DIAGNOSIS AND TREATMENT, AND ADJUSTABLE ERGONOMIC CHAIR

CROSS-REFERENCE TO RELATED APPLICATIONS

This application is the National Stage of International Application No. PCT/NL03/00148, filed 27 Feb. 2003, which claims the benefit of Netherlands Application No. NL 1020201, filed 19 Mar. 2002, the contents of which is incorporated by reference herein.

FIELD OF THE INVENTION

The invention relates to an adjustable chair for medical and paramedical diagnosis and treatment, comprising a pillar, a seat, a chair back, a support for the lower legs and if appropriate a head rest, the height of the pillar being adjustable and the remainder of the parts mentioned being adjustable with respect to one another.

BACKGROUND OF THE INVENTION

Chairs of this type are in very widespread use. One important example is a dentist's chair. Despite the great efforts made to design good chairs, existing items of medical furniture are not always able to provide the patient with the correct position for observation, diagnosis and treatment. The styling and design often cause medical complications during treatment. However, a significant, oft-neglected aspect is that the design and/or configuration of this furniture cause obstructions to the physician or other person carrying out treatment. This was stated by Prof. O. Hokwerda (Groningen University) during the congress "The Dentist as a Patient" in November 2001 in Enschede (NL).

SUMMARY OF THE INVENTION

Therefore, if the invention sets as its first object to design a chair for the abovementioned purpose which, in view of the most recent ergonomic understandings, is suitable in all respects for the physician or other person carrying out treatment who deals with patients on the chair on a daily basis and virtually throughout his entire working life, there is immediately the further object of achieving this for all sizes of patients encountered in practice i.e. varying from children to adults who may be up to 2.15 m tall. Obviously, it should also be borne in mind that it must be possible for the patient to be positioned by the treating physician with the correct head position for observation, diagnosis and treatment.

For this purpose, the chair according to the invention, in the basic concept, is characterized in that the chair back, the seat and the support for the lower legs are adjustable into a fully extended (bed) position.

None of the known chairs had this option, which prevents for example that either for the treating physician the possible ways of setting the correct position of the head were limited, or that the patient, if the physician had his head in the correct position, would be impeded in some way by this position.

On the other hand, the chair is designed in such a way that the chair back and the support for the lower legs are both adjustable into a vertical position. This too is a facility which has not been offered by the known chairs. It also ensures that the position of the patient and that of his head can be selected more appropriately both for the person carrying out the treatment and for the patient being treated.

If the chair back, the seat and the support for the lower legs are each of adjustable length, the said objectives are easily achieved irrespective of the dimensions, in particular the height, of the patient, varying from children to tall adults.

In terms of mechanical engineering, this can be achieved most successfully if the pillar, the chair back and the support for the lower legs each comprise three telescopic parts. Various methods which are known per se can be used to drive the telescopic parts.

One is accustomed to the fact that in chairs with a chair back and a lower-leg support, the angular position of which can be adjusted with respect to the seat, there are transitions at the location of the pivot axis, in particular because the three parts are separate components. However, now that, according to the invention, they are combined with the facility of all three of the parts independently having an adjustable length, it is highly advantageous if a mattress is laid over the chair back, seat and lower-leg support, the end of which mattress is wound onto a drum below the end of the lower-leg support and/or onto a drum below the top end of the chair back.

To examine and treat the head, in particular for the important application area of dentistry, the set objects require particular attention to be paid to the support given to the head. Adjustable head rests are known, in many cases limited to adjustability in the longitudinal direction of the chair back, if appropriate in combination with a forwards and backwards tilting movement. Both with a view to comfort of the patient and with a view to supporting the head in the optimum position for diagnosis and treatment, with attention being paid to the correct ergonomic position of the person carrying out the treatment, the invention first of all also proposes that the head rest be adjustable in a direction which is substantially perpendicular to the plane of the chair back. This allows good support to be provided for the head, taking account of the position of the head with respect to the back and in particular curvatures of the top part of the back, which are often encountered.

However, optimum support for the head of the patient is obtained if there is a neck rest, which can likewise be adjusted in a direction which is substantially perpendicular to the plane of the chair back, independently of the adjustment of the head rest. It has been found that independent support of the neck is of very considerable importance for the comfort of the patient if the head has to be placed in all kinds of positions which are optimum for treatment and held in these positions for a certain time.

This is advantageously realized in such a way that the head rest is composed of a pile of inflatable, substantially flat chambers, which are in the form of substantially flat ovals, while the top chamber, which is likewise inflatable, is provided with an oval, annular solid core which defines the contact surface for the back of the head, and that the neck rest is composed of a pile of inflatable, substantially shell-shaped chambers, the bases of which lie above one another and the widths of which decrease towards the top, while the top one of these shell-shaped chambers is provided with a solid core in the vicinity of the base of the shell shape.

Further explanation of the chair of this invention can be found on www.ESDE.org/Congress 2002 Piestany/Paul A.Engels: "Realization of the requirements . . . ".

The invention furthermore relates to an ergonomic chair, particularly an automobile chair, in which many of the features initially developed for a medical chair are similarly applied.

BRIEF DESCRIPTION OF THE DRAWINGS

The invention will be explained below with reference to the accompanying drawing, in which.

DETAILED DESCRIPTION OF PREFERRED EMBODIMENTS

Figure 1:
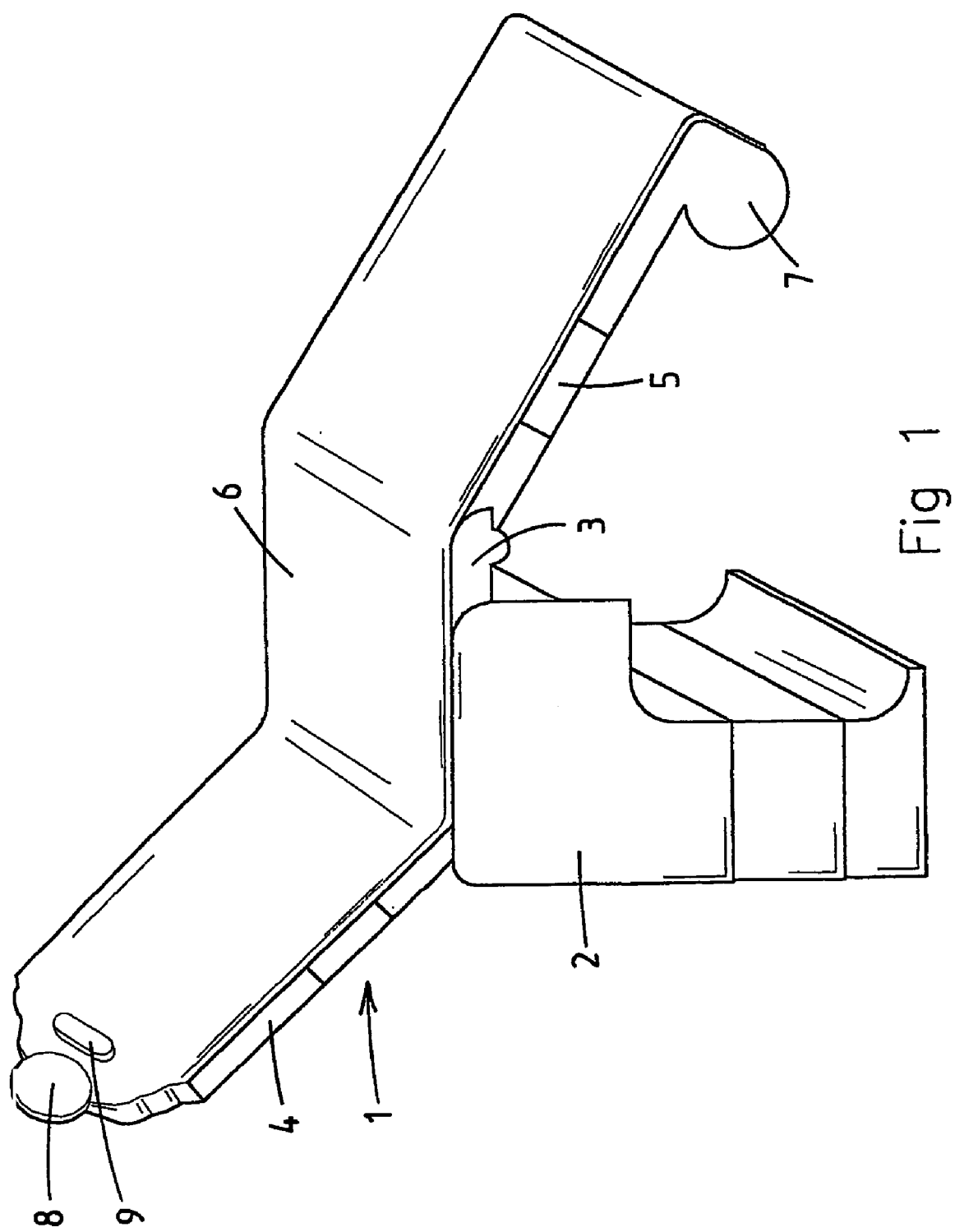
FIG. 1 shows an embodiment of the adjustable chair according to the invention in an intermediate position.

FIG. 1 shows the chair, which is denoted overall by 1, in an intermediate position. A pillar 2 bears a seat 3, to which a chair back 4 and a support 5 for the lower legs are pivotably connected. Both the pillar 2 and the chair back 4 and the lower-leg support 5 are each composed of three parts which are telescopic with respect to one another, allowing the length and height to be adjusted to all sizes of patients which are encountered in practice. The seat 3 is also composed of telescopic parts; since there are fewer variations in size in people with regard to support of the lower legs, it may be sufficient to make do with two parts.

Figure 2:
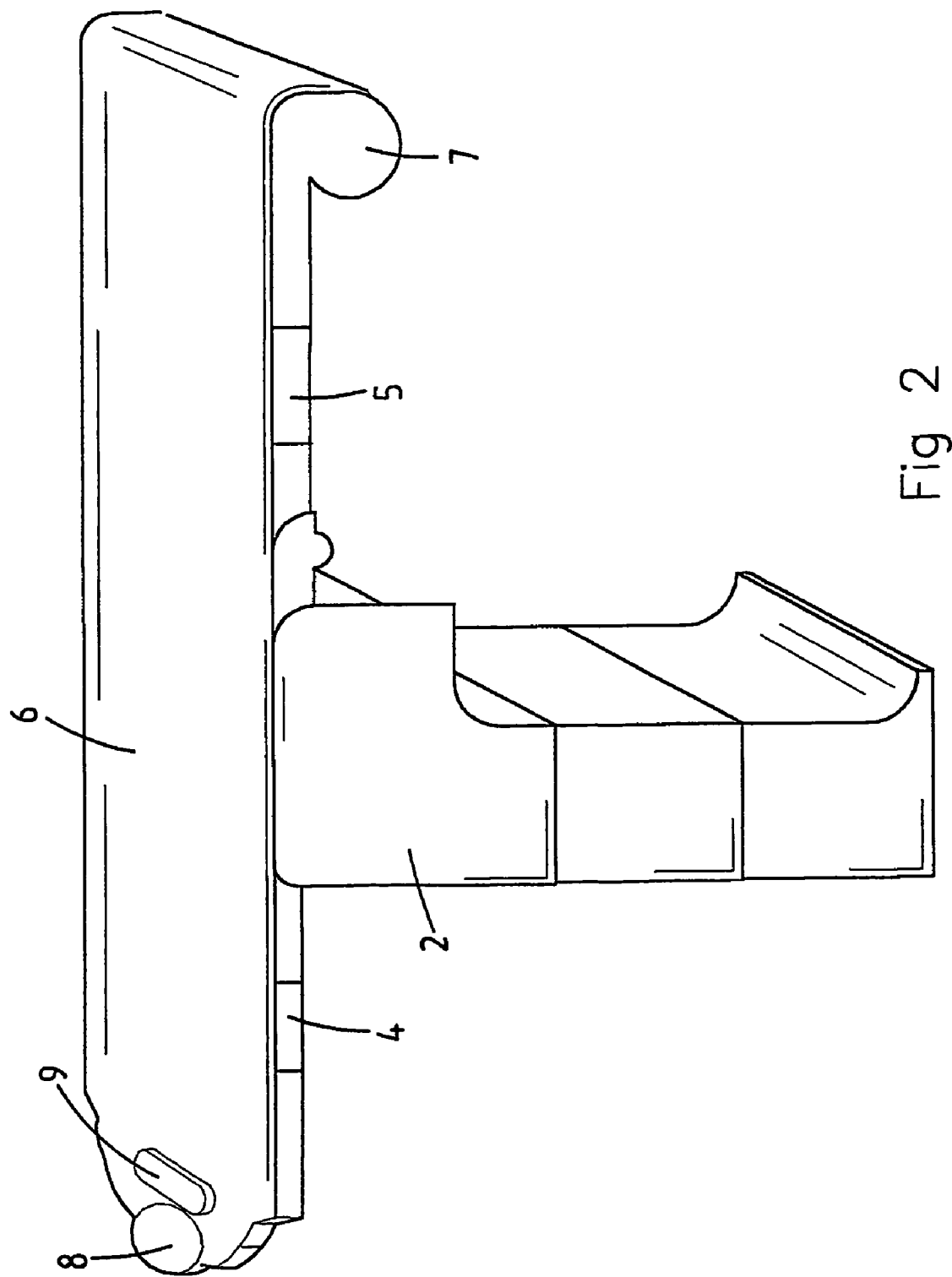
FIG. 2 shows the associated extended position or bed position.

The pivoting connections between the parts 3 and 4, on the one hand, and 3 and 5, on the other hand, are designed in such a way that the fully extended position shown in FIG. 2 can be reached, so that a bed is obtained.

Figure 3B:
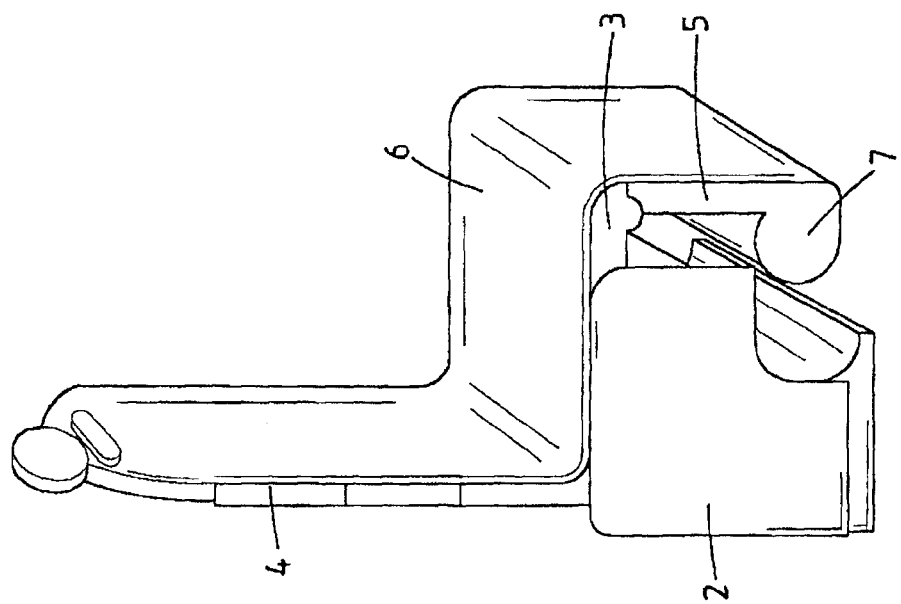
FIGS. 3a and 3b show the position with a vertical chair back and lower-leg support, respectively in the smallest size and in a size which is adjusted to greater heights of patient.
Figure 3A:
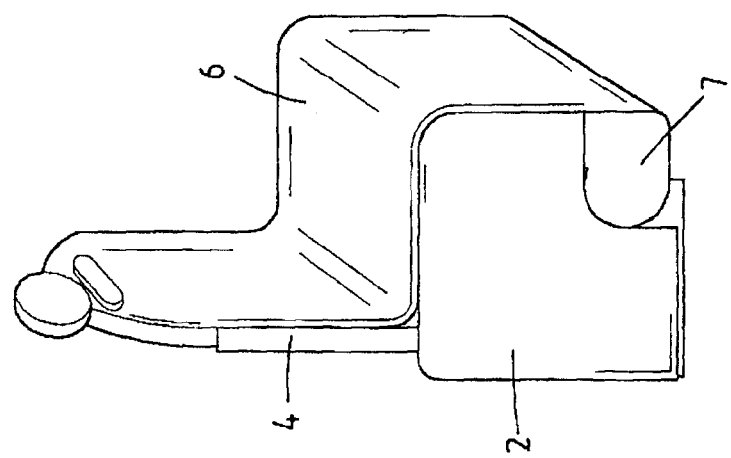

On the other hand, the pivoting connections are also designed as shown in FIGS. 3a and 3b: the chair back 4 and the lower-leg support 5 are both in a vertical position while the seat position 3 is horizontal.

FIG. 3a at the same time shows the situation in which the seat 3, the chair back 4 and the lower-leg support 5 have been telescopically retracted into one another until the minimum length is reached. In FIG. 3b the chair back 4 and the seat 3 have both been extended to their maximum length, while in the vertical position the lower-leg support 5 is still at its shortest length. In FIG. 3b, the pillar 2 has been lengthened slightly in order to move the chair into a higher position compared to the lowest position shown in FIG. 3a.

Returning to FIGS. 1 and 2: these figures show all the parts 3, 4 and 5 in their maximum length, but they may obviously also be shortened in these positions according to the body size of the patient. It can also be seen that FIG. 2 shows the pillar 2 at its maximum height, since this will generally be necessary when working with a patient when the chair is in the bed position.

To cover the pivoting joints and the telescopic components, a mattress 6 is laid over the whole of the chair back, seat and lower-leg support. When the length of the parts is changed, the lower end of the mattress is automatically wound up onto a drum which is located beneath the end of the lower-leg support 5, at position 7. Of course, the problem of adjusting the length of the mattress 6 can in principle also be resolved by arranging a roll of this type at the top of and below the chair back 4, although this solution has not been implemented in the embodiment illustrated; in this case, at the top of the chair back recesses are provided in the mattress for a head rest 8 and a neck rest 9.

Figure 4:
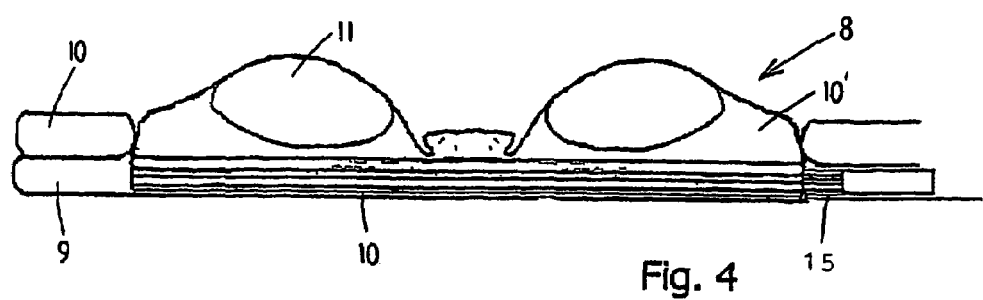
FIG. 4 shows a sketch, nominally in cross section, of an embodiment of the adjustable head rest in the uninflated state.

FIG. 4 shows a cross section through the head rest in the uninflated, i.e. lowest state. The head rest is held in a recess in the shell 9 with the mattress 9' of the chair. There is a number of inflatable chambers which are of substantially the same size and are oval in shape when seen from above. The top chamber 10' is provided with a solid core 11 which defines the oval shape of the contact surface for the back of the head.

Figure 5:
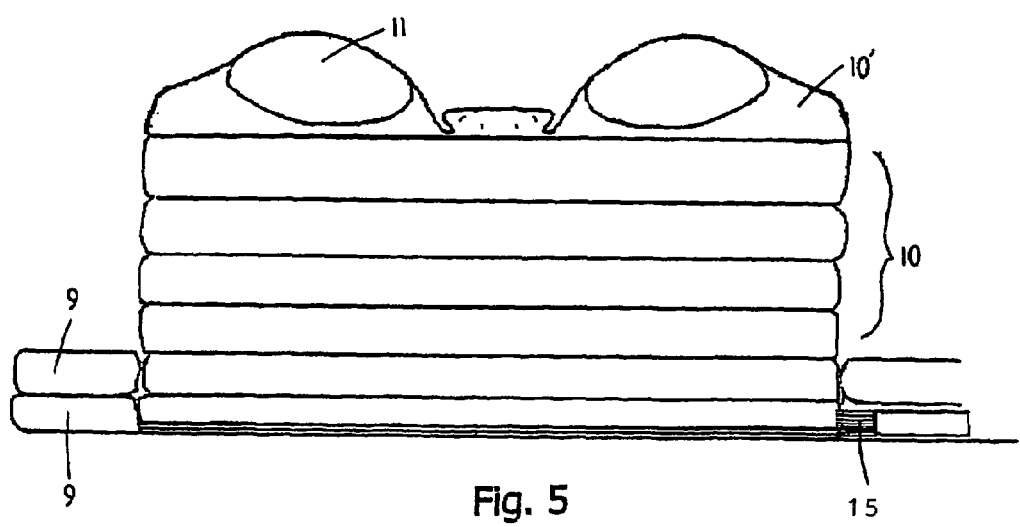
FIG. 5 shows the associated inflated state.

FIG. 5 shows the state in which 6 chambers 10 have been inflated. A gas (air) or a liquid can be used to inflate the chambers. In the embodiment shown, there is a total of 8 of these chambers. They are inflated from the top downwards as required, i.e. according to the position of the head of each patient with respect to his back and the desired position of the head.

Feed and discharge lines 15 for inflating the chambers 10 are also indicated in both figures.

Figure 6:
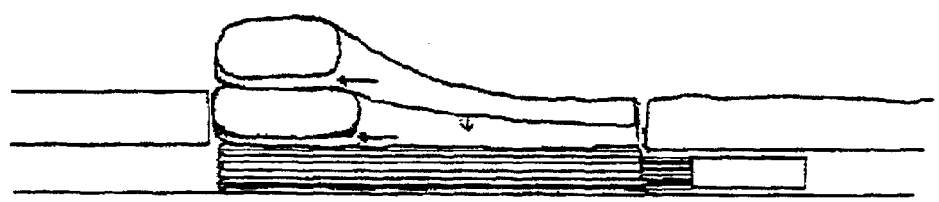
FIGS. 6 and 7 in the same way show an embodiment of the neck rest in the uninflated and inflated states, respectively, and FIG. 8 diagrammatically depicts the finished shape of the fully inflated neck rest.
Figure 7:
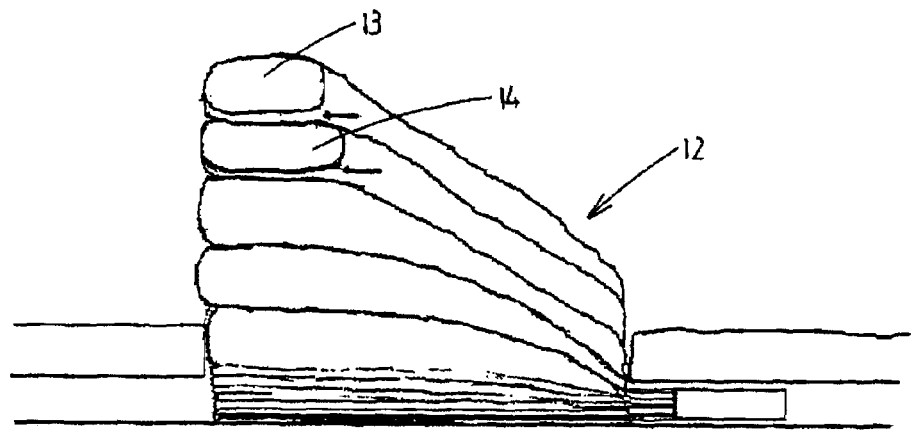

In the same way, FIGS. 6 and 7 show a neck rest, illustrated in the uninflated and inflated states for some of the chambers. The neck rest is also accommodated in the recess in the mattress and the shell.

In this case, the inflatable chambers 12 are of shell-shaped design. The bases lie approximately directly above one another, as can be seen from FIGS. 6 and 7. The top one of the chambers 12 once again has a solid core 13, in this case simply in the form of a small cushion. The embodiment also has a solid core 14 of this type in the second chamber.

Figure 8:
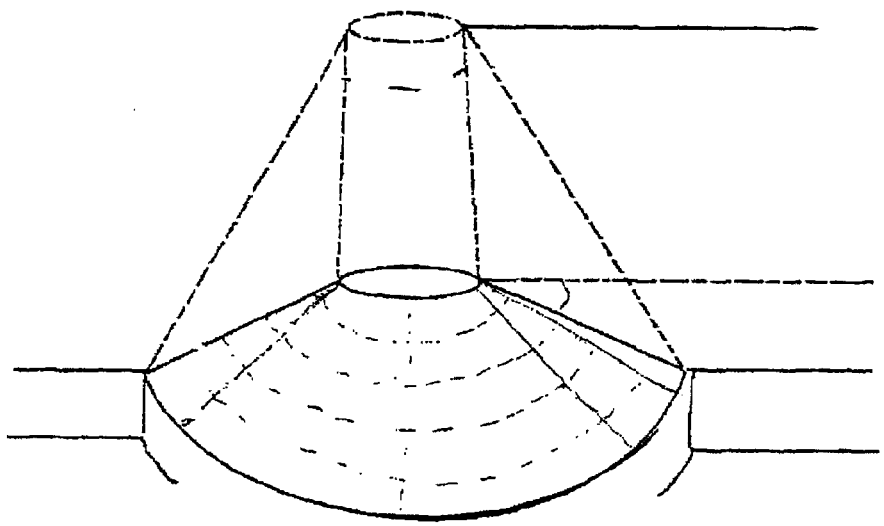

The widths of the chambers decrease towards the top. The result of this is diagrammatically indicated in FIG. 8: approximately a truncated cone shape is formed, although obviously with a shell-shaped base plane. The conical shape of the neck rest which is sketched means that the neck of a patient is still provided with good support when he turns his head to one side.

FIG. 9 indicates how the head rest and neck rest are operated when the head of the patient has to be tilted backwards or forwards with a view to carrying out a treatment. FIG. 9a sketches the situation in which the patient has his head in a normal upright position. A dashed line indicates the main direction of the mouth with respect to the body.

Figure 9A:
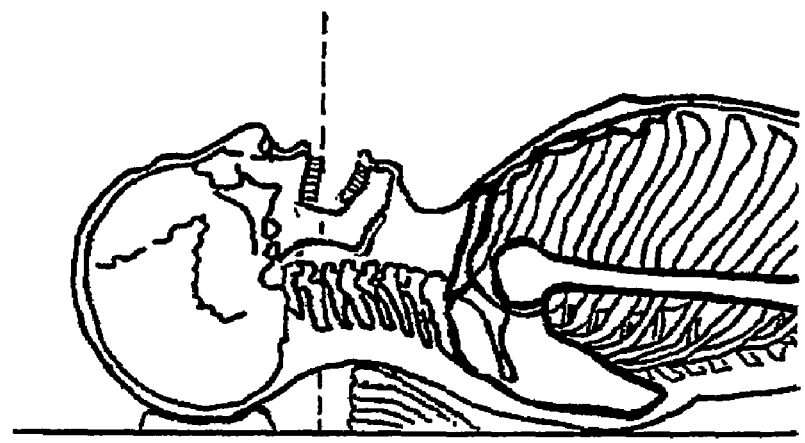
FIG. 9 shows anatomical illustrations of the way in which the head rest and neck rest interact with the head in various positions thereof.
Figure 9B:
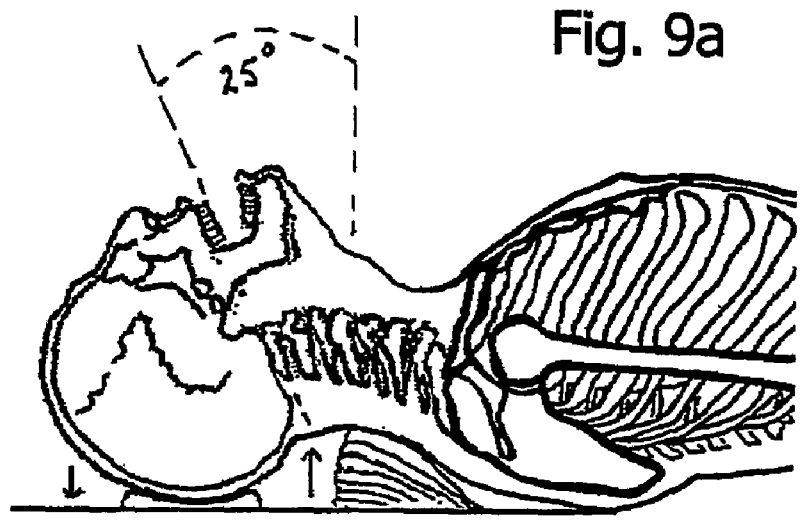

In FIG. 9b, the patient has tilted his head 25 degrees backwards. There is no need to change the shape or height of the head rest, but it can be seen that the neck rest has been inflated a little further, i.e. is higher, in order still to adequately support the neck of the patient.

Figure 9C:
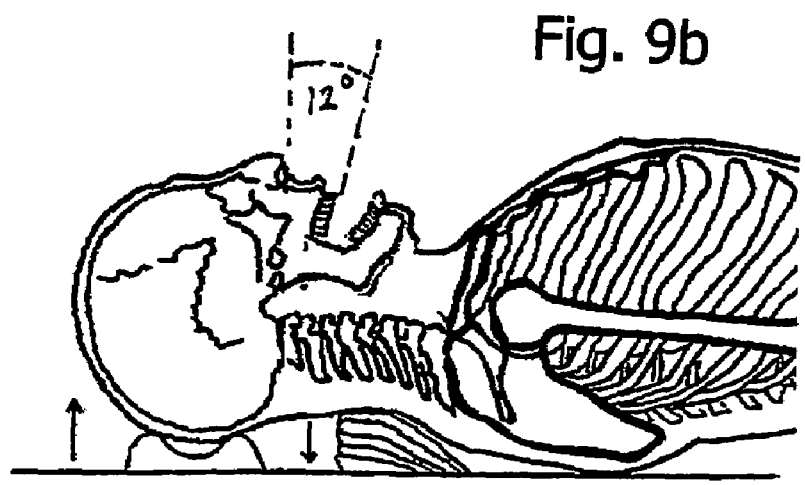
Figure 9C:

In FIG. 9c the situation has been sketched in which the patient has bent his head 12 degrees forwards. The patient can only do this comfortably if the neck rest is adjusted to be slightly lower and the head rest is adjusted to be slightly higher. For the sake of completeness, the shape of the head rest, with the oval ring, and the conical, partially inflated shape of the neck rest are sketched beneath FIG. 9c.

A simplified, and therefore cheaper embodiment of a chair for medical purposes in which the neck rest and the head rest are jointly adjustable, obtains a considerable part of the advantages of the invention over the prior art, and is therefore comprised within the scope of the invention.

Furthermore, the invention considers that many of its features can be applied, and the associated advantages obtained, with so-called ergonomic chairs for use under many circumstances where people are to sit during a relatively long time. A particularly important field thereof is automobile chairs. Taking as a fact that a luxurious type of car chair with length-adjustable support for the lower legs is known already, the following features of the present invention can be purposefully applied further:

adjustability of the length of the seat and/or the chair back, a mattress laid over chair back and seat, possibly also over a lower-leg support, winding such mattress over a drum, adjustability of a head rest in a direction which is substantially perpendicular to the plane of the chair back, the presence of a neck rest which is likewise adjustable in a direction substantially perpendicular to the plane of the chair back, independently of the adjustment of the head rest, or jointly therewith, the structure of head rest and neck rest comprising inflatable chambers as disclosed.

What is claimed is:

1. An adjustable chair for medical and paramedical diagnosis, and treatment, the adjustable chair comprising:
   a pillar adjustable in height;
   a seat adjustable in length;
   a leg support adjustable in length;
   a chair back adjustable in length;
   a head rest;
   a neck rest;
   a mattress adjustable in length;
   a drum located below the end of the leg support or below a top end of said chair back;
   wherein said chair back, said seat, and said leg support are pivotal with respect to one another;
   wherein when said mattress is laid over said chair back, said seat, and said leg support, and an end of said mattress is wound onto the drum during adjustment of said adjustable chair; and
   wherein said head rest and said neck rest are independently adjustable in a direction which is substantially perpendicular to the plane of the chair back.

2. An adjustable chair for medical and paramedical diagnosis, and treatment, the adjustable chair comprising:
   a pillar adjustable in height;
   a seat adjustable in length;
   a leg support adjustable in length;
   a chair back adjustable in length;
   a head rest adjustable in a direction which is substantially perpendicular to the plane of the chair back;
   a mattress adjustable in length;
   a drum located below the end of the leg support or below a top end of said chair back;
   wherein said chair back, said seat and said leg support are pivotal with respect to one another;
   wherein when said mattress is laid over said chair back, said seat, and said leg support, and an end of said mattress is wound onto the drum during adjustment of said adjustable chair;
   wherein said head rest is composed of a first plurality of inflatable, substantially flat, ovals chambers stacked upon each other;
   wherein a topmost chamber of said first plurality of inflatable chambers is provided with an oval, annular solid core which defines a contact surface for the back of a patient's head.

3. The adjustable chair according to claim 2 wherein the pillar, said chair back and said leg support each comprise three telescopic parts.

4. The adjustable chair according to claim 2 wherein the said chair back and said leg support are adjustable into a vertical position.

5. The adjustable chair according to claim 2 wherein said chair back, said seat and said leg support are adjustable into a fully extended (bed) position.

6. The adjustable chair according to claim 2, further comprising a neck rest, wherein said neck rest is composed of a second plurality of inflatable chambers, the bases of which lie above one another and the widths of which decrease towards the top; and
   wherein a topmost chamber of said second plurality of chambers is provided with a solid core in the vicinity of the base of said topmost chamber of said second plurality of chambers.

7. A chair for medical and paramedical diagnosis and treatment, the chair comprising:
   at least one seat;
   a chair back;
   an adjustable head rest arranged above the chair back;
   a neck rest;
   a drum;
   a mattress laid over said chair back and said at least one seat;
   wherein said at least one seat or said chair back is adjustable in length;
   wherein said head rest and said neck rest are independently adjustable in a direction which is substantially perpendicular to the plane of the chair back;
   wherein said mattress is wound over said drum;
   wherein said head rest is composed of a first plurality of inflatable, substantially flat, oval chambers stacked upon each other;
   wherein a topmost chamber of said first plurality of inflatable chambers is provided with an oval, annular solid core which defines a contact surface for the back of a patient's head;
   wherein said neck rest is composed of a second plurality of inflatable chambers, the bases of which lie above one another and the widths of which decrease towards the top; and
   wherein a topmost one of the second plurality of chambers is provided with a solid core in the vicinity of the base of said topmost chamber of said second plurality of chambers.

8. The chair of claim 7 wherein said at least one seat is independently adjustable from said head rest and independently adjustable from said neck rest.

9. A chair for medical and paramedical diagnosis, and treatment, the chair comprising;
   at least one seat;
   a chair back;
   an adjustable head rest arranged above the chair back;
   a neck rest;
   wherein said head rest and said neck rest are independently adjustable in a direction which is substantially perpendicular to the plane of the chair back;
   wherein said head rest is composed of a first plurality of inflatable, substantially flat, oval chambers stacked upon each other; and
   wherein a topmost chamber of said first plurality of inflatable chambers is provided with an oval, annular solid core which defines a contact surface for the back of a patient's head;
   wherein said neck rest is composed of a second plurality of inflatable, substantially flat chambers, the bases of which lie above one another and the widths of which decrease towards the top; and
   wherein a topmost one of said second plurality of chambers is provided with a solid core in the vicinity of the base of said topmost chamber of said second plurality of chambers.

* * * * *